United States Patent
Fleckenstein et al.

(10) Patent No.: US 7,498,073 B2
(45) Date of Patent: Mar. 3, 2009

(54) SHAPED PRODUCT HAVING A TOUCH-FRIENDLY SURFACE

(75) Inventors: Sybille Fleckenstein, Offenbach/Main (DE); Thilo Schwer, Offenbach/Main (DE); Jens Pohlmann, Offenbach/Main (DE)

(73) Assignee: KAHLA/Thuringen Porzellan GmbH, Kahla (DE)

( * ) Notice: Subject to any disclaimer, the term of this patent is extended or adjusted under 35 U.S.C. 154(b) by 0 days.

(21) Appl. No.: 11/060,516

(22) Filed: Feb. 17, 2005

(65) Prior Publication Data

US 2005/0196582 A1    Sep. 8, 2005

(30) Foreign Application Priority Data

Feb. 18, 2004 (DE) .................. 10 2004 007 918
Dec. 23, 2004 (EP) .................. 04030637

(51) Int. Cl.
*B05D 1/14* (2006.01)
(52) U.S. Cl. .................. 428/90; 427/462; 427/463
(58) Field of Classification Search .................. 428/90
See application file for complete search history.

(56) References Cited

U.S. PATENT DOCUMENTS

| | | | | |
|---|---|---|---|---|
| 3,674,611 A | * | 7/1972 | Petry et al. | 428/319.7 |
| 3,765,922 A | * | 10/1973 | Chisholm | 427/200 |
| 4,125,657 A | * | 11/1978 | Gonzalez | 428/90 |
| 4,734,307 A | * | 3/1988 | Thorsrud | 428/90 |
| 4,781,978 A | * | 11/1988 | Duan | 428/383 |
| 2003/0168877 A1 | | 9/2003 | Esteban | |

FOREIGN PATENT DOCUMENTS

| | | |
|---|---|---|
| DE | 1 901 934 | 1/1969 |
| DE | 37 30 477 | 3/1989 |
| DE | 100 12 846 | 9/2001 |
| DE | 100 58 090 | 10/2002 |
| EP | 0 460 532 | 12/1991 |
| JP | 63242249 | 7/1988 |
| JP | 04042881 | 2/1992 |

* cited by examiner

*Primary Examiner*—Jenna-Leigh Johnson
(74) *Attorney, Agent, or Firm*—Hodgson Russ LLP

(57) ABSTRACT

The present invention relates to a shaped product, particularly a shaped ceramic article or shaped glass article, having a touch-friendly surface. The invention also relates to a process for manufacturing such a shaped product, particularly such shaped ceramic article or shaped glass article, and also relates to its use, for example in the household, laboratory, building construction and industry fields.

36 Claims, No Drawings

SHAPED PRODUCT HAVING A TOUCH-FRIENDLY SURFACE

The present invention relates to a shaped product, particularly a ceramic product or a glass product, having a touch-friendly surface. Especially, the present invention relates to a shaped product, particularly a ceramic product the surface of which—or at least one portion thereof or several portions thereof—is/are coated with a material which, when being touched, provides a pleasant feeling. The invention also relates to a process of manufacturing such a shaped product, in particular such a ceramic product, and also relates to its use, for example in the household, in the laboratory, in the building construction field and in the industry.

From the prior art, there are known materials which may be applied to surfaces of different character in order to change certain properties of said surfaces. These properties may, for example, be haptic or optical properties, i. e. properties which are connected to the touch of or the view to the respective material, but may also be properties of the technical type as, for example slipping resistance, lack of thermal conductivity or dirt repelling properties. For example, in the industry of motor vehicles or when treating automotive vehicle spare parts or inner appliance parts, surfaces made of plastics are coated with a plastics flock material in order to provide a pleasant feeling when touching such plastics surfaces. Furthermore, such surfaces to which the flock material was applied are considered to be more attractive optically than the "neat" plastics surfaces. It is another advantage that such surfaces, at least optically, provide the impression of getting dirty less rapidly than plastics surfaces which often attract dust and then appear to look unpleasant if not cleaned on a regular basis. If radiated by sun rays, for example in the summer, neat plastics surfaces and parts (particularly if colored in dark colors) may become so hot that they almost cannot be touched. This is not perceived in the same way if such surfaces are coated with a plastics fiber flock material.

Examples of plastics parts and plastics surfaces in the automotive area for which flock coatings are provided frequently in the meantime are window and door profiles of vehicles, storage areas (for example the so-called "glove compartment"), door inner coverings and vehicle ceilings. Comparable coatings may be found also with furniture (for example coatings of the seat area of plastics chairs) or with textiles. There were no reports up to now about flock coatings on ceramic materials, glass materials and similar shaped products.

It is the object of the present invention to provide shaped products as, for example articles made of ceramics or glass the surfaces of which, at least partly, are coated with a material which imparts a good appearance and a pleasant haptic touch feeling to such surfaces. It is another object of the invention to provide shaped products as, for example, articles made of ceramics or glass which are coated with a material having technical advantages compared to the uncoated ceramic or glass material surface. A further object of the invention is to provide a process for manufacturing such coated shaped products as, for example, articles made of ceramics or glass. Finally, object of the invention is also the use of such shaped products coated with a layer as, for example, articles made of ceramics or glass, for example in a household, in a laboratory, in the building construction field or in the industry.

Surprisingly, it was found that ceramic surfaces, glass surfaces or surfaces made of other materials may be coated completely or partly with fibers soft as velvet in a durable manner. Shaped articles thus obtained, made of ceramics, glass or other materials and having a coating of fibers soft as velvet on at least a portion of their surface not only have desired and pleasantly experienced optical and haptic properties, but also offer surprising technical advantages as, for example a barely discernible heat susceptibility, a poor heat conductivity, a good heat isolation property and a resistance, not considered possible up to now, against a number of aggressive chemical substances as, for example, alkaline compounds.

The invention relates to a shaped product, comprising, on at least a portion of its surface area, a firmly adhering material which changes at least one property of the surface of the shaped product.

Preferred embodiments of the shaped product according to the invention can be learnt from the dependent claims 2 to 4.

The invention also relates to a temperature-hardened shaped ceramic article comprising, on at least a portion of its surface area, at least one firmly adhering fiber flock material.

Preferred embodiments of the shaped ceramic article according to the invention are claimed in the dependent claims 6 to 18.

The invention also relates to a shaped glass article comprising, on at least a portion of its surface area, at least one firmly adhering fiber flock material.

Preferred embodiments of the shaped ceramic article according to the invention are claimed in the dependent claims 20 to 22.

The invention also relates to a process for the manufacture of a shaped product comprising, on at least a portion of its surface area, a firmly adhering material, by manufacturing a crude shaped product having a defined structure; optionally providing said crude shaped product, on at least a portion of its surface area, with a coating improving its utility; and at least a portion of the surface area of the crude shaped product, optionally provided with a coating improving its utility, with a firmly adhering material changing at least one surface property of the shaped product.

Preferred embodiments of the process are claimed in the dependent claim 24.

The invention also relates to a process for the manufacture of a temperature-hardened shaped ceramic article comprising, on at least a portion of its surface area, at least one firmly adhering fiber flock material by manufacturing a crude shaped article made of a ceramic raw material, drying and/or sintering said crude shaped article and optionally providing the dried and/or sintered crude shaped article thus obtained with at least one glaze on at least a portion of its surface and baking said glaze at an elevated temperature, wherein a fiber flock material is adhered to at least a portion of the surface of the dried and/or sintered crude shaped article or to at least a portion of the surface of the elevated temperature-baked crude shaped article provided with the glaze.

The invention also relates to a process for the manufacture of a shaped glass article comprising, on at least a portion of its surface area, at least one firmly adhering fiber flock material by manufacturing a crude shaped glass article made of a glass raw material, cooling and/or annealing said crude shaped glass article and optionally providing the cooled and/or annealed crude shaped glass article thus obtained with at least one glaze on at least a portion of its surface and baking said glaze at an elevated temperature, wherein a fiber flock material is adhered to at least a portion of the surface of the cooled and/or annealed crude shaped glass article or to at least a portion of the surface of the elevated temperature-baked crude shaped glass article provided with the glaze.

Preferred embodiments of the processes according to the invention are claimed in the dependent claims 27 to 38.

The invention also relates to the use of the shaped article comprising, on at least a portion of its surface area, a firmly adhering material in a household, in a laboratory, in the building construction field and industry, for example as tableware, drinking vessel, as mirror, in the sanitary ceramics field, as construction material (bricks, tiles, floor covering etc.) etc.

The invention also relates to the use of the temperature-hardened shaped ceramic article or shaped glass article according to the invention having applied, to at least a portion of its surface area, a fiber flock material in a household, in a laboratory, in the building construction field and industry, a particularly preferred embodiment of which is the use as table-ware, drinking vessel, or cooking vessel.

In the frame of the present description and in the claims, the term "shaped products" or "shaped articles" means, in its broadest sense, products or articles manufactured from a shapeless mass on any arbitrary route, having a self-standing shape and possibly serving amuse in the household, in the laboratory, in the building construction field, in the industry and in related fields. The application fields are not restricted. They comprise for example (but not in a restrictive way) articles made of ceramic materials, particularly porcelain, glass, plastics (polymers of all kinds), wood, metal or of any composite materials comprising two or three or more of the above-mentioned materials. Preferred in accordance with the invention are shaped products made of ceramic materials, porcelain, glass and metal, with ceramic materials, porcelain and glass being particularly preferred.

In the frame of the present description and in the claims, the term "ceramics" or the term "ceramic material" means, in its broadest sense, all materials made up of inorganic and primarily non-metallic compounds and elements which are manufactured in accordance with classical methods of manufacturing ceramics or also according to modern methods of, for example, manufacturing glass ceramics, oxide ceramics, or powder metallurgy. The term "non-metallic compounds or elements" mentioned above does not mean that the compounds cannot contain metals; as is well known, important ceramic raw materials as, for example, kaolinite or illite are minerals containing metals (aluminum, silicon, potassium). Quite to the contrary, the term "non-metallic elements or compounds" means that the materials covered by the term "ceramics" primarily consist of compounds having a non-metallic character.

In a narrower sense, the term "ceramics" as used in the frame of the present specification and claims means such materials which may be shaped, at room temperature, from an inorganic non-metallic ceramic raw mass and obtain their properties (partly also serving a further differentiation and categorization) in the course of a subsequent drying step and a further subsequent baking or curing step called "sintering". It goes without saying that the term "ceramic materials" in the above sense also covers materials which are provided with a protective and/or decorative coating after the sinter baking.

Particular examples (not, however, restricting the present invention) of ceramic materials are earthenware ceramic materials which, with respect to the size of their structural components, are classified into coarse (particle size >0.2 mm) and fine (particle size <0.2 mm) earthenware ceramic materials. The former materials predominantly are construction materials and materials used in the industrial field, while the latter, distinguished as pottery (having a relatively high porosity and, hence, a higher water absorption (>2 weight-%)) and earthenware (having a relatively low porosity and relatively high pore density and, hence, a lower water absorption (<2 weight-%)) are used in the laboratory and particularly in the household. As examples, there may be mentioned pottery materials as materials manufactured by doing pottery, stoneware as materials for kitchenware or sanitary goods, earthenware as materials for sanitary goods of for tiles, or porcelain as materials for high quality tableware. All the above materials are covered by the term "ceramics" in the above sense.

However, "ceramics" in the sense of the present invention also are special ceramic materials. With respect to their definition (not restricting the present invention), as also to the definition of the term "ceramics" for the present invention, reference is made to the dictionary "Römpp's Lexikon der Chemie", $10^{th}$ edition, key-words "Keramik" (ceramics) and "Keramische Werkstoffe" (ceramic materials), the content of which, with respect to the definition of "ceramics", is enclosed into the present disclosure by the reference.

In accordance with the present invention, no restriction is made with respect to the ceramic material of the present shaped ceramic article. Hence, in preferred embodiments of the invention, there may be used ceramic materials covered by the definition of "coarse ceramic materials" and ceramic materials covered by the definition of "fine ceramic materials" as well. Particularly preferably, the present invention is used for fine ceramic materials. Of those, the ceramic materials having at least one glaze layer or having even two or more glaze layers on the ceramic basic material are even more preferred, and porcelain is particularly preferred since the advantages of the invention are particularly outstanding for porcelain materials. In particularly preferred embodiments of the invention, a white glaze; layer may consist, for example, of kaolin, calcspar (calcite), dolomite, feldspar, kaolin fireclay and/or quartz sand as the basic materials containing admixed, for example, $SnO_2$ or $ZrO_2$ for an opaque white glazing layer, while colored glaze layers comprise, for example, one or more than one of the same basic materials mentioned above, and metal oxides as, for example, cobalt oxide, chromium oxide, copper oxide, manganese oxide and/or iron oxide.

The term "shaped ceramic article" as used in the present specification and claims means an article consisting of one or more than one ceramic material which, in the course of a shaping method (per se known in the present technical field), was shaped into a self-standing shape from a substantially unshaped raw mass. The shaping method may be, for example, a modeling method, an extrusion method, a casting method (slip casting, injection molding), a powder pressing method (wet pressing, dry pressing, isostatic pressing), without restricting the present invention.

The term "temperature hardened" as used in the present description and in the claims means that the shaped ceramic article, after shaping it, is subjected to at least one drying step at an elevated temperature and controlled (in most cases reduced) humidity in accordance with per se known procedures and under per se known conditions. For this purpose, all known and conceivable processes may be carried out, as for example (without restricting the invention) the steps of so-called "kiln drying", air drying, rock drying, chamber drying or tunnel drying. As is known, all those processes are conducted at elevated temperatures (for example by using the waste heat of parallel baking processes of other ceramic materials), for example at temperatures in the range of from 50 to 200° C., and at a controlled, for example controlled reduced, humidity of the air.

The term "temperature hardened" in a narrower sense, as used in the present specification and claims, means that, after the shaping step, a shaped ceramic article was subjected to at least one drying step (in the afore-mentioned sense) and, subsequently, was subjected to at least one step of ceramic baking or ceramic sintering. As it is well known, the temperatures of those steps are >800° C. and strongly depend upon the composition of the ceramic material, the desired porosity or density of the shaped ceramic article obtained and the desired use of the final product. For example, the so-called "smooth baking" of porcelain is conducted at temperatures in the range of from 1,350° C. to 1,400° C.

In the present invention, the term "temperature hardened" in the aforementioned narrower sense also comprises that the shaped ceramic article, after subjecting it to the drying and sintering steps, is provided with a protective and/or decorative glaze, too, which glaze is subjected to baking or sintering steps in per se known manner. These final steps, too, are conducted at elevated temperature, as is well known, usually at a temperature >1,000° C.; the actual temperature depends upon the material used for applying the glaze, the desired density of the glaze and the intended use of the final product.

From the above explanations, preferred (but not restrictive) examples of shaped ceramic articles are shaped ceramic articles having technical utility (for examples insulating articles), tiles for roofs, articles of the sanitary ceramic field (for example washbasins, toilet bowls, bidet bowls, bathtubs, shower tubs), tiles for walls or floors, decoration articles and consumers goods made or ceramic materials (for example sculptures, lampshades, vases, bowles and dishes and table ware), shaped articles made of porcelain (for example plates, cups, bowles, dishes, vases, pots, figurines, grips for cutlery, lampshades, chandeliers), etc.

Shaped articles according to the invention may also be made of other materials. Examples are glass, polymers ("plastics"), wood, metals or composites of one or more of the above-mentioned materials.

Another preferred material is glass. The term "glass" as used in the present description and claims means a substance being in the amorphous non-crystalline solid state in the meaning of a frozen undercooled melt; "glass" in the narrower sense is defined in the present invention as an inorganic oxidic melt product, substantially comprising $SiO_2$, $Na_2O$, optionally (depending upon the intended use) other metal oxides as, for example CaO, MgO, $K_2O$, PbO as well as $B_2O_3$ and/or $Al_2O_3$, which melt was transferred into the solid state by a freezing step without a crystallization of the melt phase components.

In more preferred embodiments of the invention, the shaped glass articles may be glasses for drinking purposes (for example stem glasses of all conceivable kinds and variants for different drinks), household glasses, tea glasses, glasses and jars for filling in different materials including food, glass containers for perfumes (small bottles for fragrances), insulating glass (glasses having double walls and being evacuated between the two walls) for liquids of all kinds as, for example, coffee or tea, flat or shaped glasses for windows, protective walls, for vehicles, particularly motor vehicles, etc. or for mirrors, without restricting the invention to those mentioned above in the glass area.

Preferred shaped articles are also articles made of polymers or metals. Examples are jugs (including those for household purposes or for laboratory use), boxes or other containers for conserving, freezing or heating (for example by microwaves) food or for their protection against environmental influence (for example light), pots and pans for cooking.

In accordance with the invention, the shaped product according to the invention comprises a firmly adhering material on at least a portion of its surface, which material changes at least one property of the shaped product surface. The term "on at least a portion of its surface" as used in the present description and claims means that the material changing at least one property of the surface of the shaped product may cover the whole surface of the shaped product and may adhere to the whole surface of the shaped product. Preferred in accordance with the invention is an embodiment wherein the material changing at least one property of the shaped product surface is present only on a portion, particularly preferably only on an exactly defined portion, of the surface of the shaped product and is adhering thereto firmly. As described subsequently in detail, that portion of the surface of the shaped product to which the material changing at least one property of the surface of the shaped product is applied and to which it adheres firmly, may be determined solely or at least to a great extent by decorative purposes. In an alternative embodiment, it is also possible that the portion of the surface of the shaped product to which the material changing at least one property of the surface of the shaped product is applied and to which it adheres firmly, may be determined solely or at least to a great extent by utility purposes. It goes without saying that it is also possible to apply criteria, which are determined by both aspects (and, optionally, also further aspects), when determining that portion of the surface of the shaped product to which the material changing at least one property of the shaped product surface is applied and firmly adhered.

A firm adhesion of the material changing at least one property of the shaped product surface to at least a portion of the surface of the shaped product may be achieved on each route known to a skilled person for the step of firmly adhering such materials to porous, dense or even smooth surfaces, without that the invention is restricted to certain routes. In a preferred embodiment of the invention, a firm adhesion of the material changing at least one property of the shaped product surface to at least one portion, more preferably to one portion, of the surface of the shaped ceramic product is achieved by means of an adhesive layer which covers the (partial) surface of the shaped product which is to be coated with the material changing at least one property of the surface of the shaped product. With respect to the adhesive of the adhesive layer, the skilled person is not barred by any limits, and all conceivable adhesives are suitable which effect a firm adhesion of the material changing at least one property of the surface of the shaped product to the actual (partial) surface of the shaped product. In each single case, there are available to a skilled person numerous adhesives compatible with the material of the shaped product and with the intended material changing at least one property of the surface of the shaped product as well, and optionally with further requirements (resistance against chemical substances, resistance against light, compatibility with food etc.).

In the frame of the present invention, the term "material changing at least one property of the surface of the shaped product" as used in the description and in the claims means a material the application of which to the surface of the shaped product or article results into a situation that at least one, more preferably one or two, property/properties are changed which characterize the surface of the shaped product without such a material. In preferred embodiments of the invention, the changing property may, for example (but without limiting the invention), be selected from optical properties (e. g., without restriction, gloss, transparency, refraction index), haptic properties (e. g., without restriction, smoothness or roughness, texture, adhesiveness), thermal properties (e. g., without restriction, thermal conductivity or thermal insulation, thermal radiation), chemical properties (e. g., without restriction, resistance against light, resistance against chemical substances as, for example, alkaline substances, swelling properties, water absorption, water repelling power), biological properties (e. g., without restriction, resistance against attack by microorganisms as, for example, bacteria or fungi) or combinations of two or more of the above-mentioned properties. In particularly preferred embodiments, the material may change one property or several properties of the above group of optical, haptic, thermal, chemical or biological properties on the surface of the shaped product, most preferably the transparency and/or the texture and/or the thermal radiation, optionally in connection with one or more than one chemical property as, for example, the resistance against chemical substances.

The materials which may be used in accordance with the invention and which, upon application onto at least a portion of the surface of the shaped product, change at least one of the shaped product surface properties may be any materials without restriction known to a person having ordinary skill in this technical field to be able to change one property or several properties of the surface of said shaped product. In preferred embodiments, of the invention, the materials may be selected from the group of films for changing the transparency and/or the refraction index of the surface, layers for changing the gloss of the surface, layers for changing the roughness or smoothness of the surface, layers (as for example fiber layers) for changing the texture of the surface, adhesive layers for changing the adhesiveness or stickiness of the surface, insulation layers for changing the thermal properties of the surface, protective layers against damaging influence of light, chemical substances, water and/or attack by microorganisms, wherein the material(s) which can be used alone or in combination may have one of the above functions or may have several of the above functions or may have also further functions.

Particularly preferred according to the: invention, the material which changes at least one property of the surface of the shaped product is at least one fiber flock material firmly adhering to at least a portion of the surface of the shaped product or article. The term "at least to a portion of the surface of the shaped product" as used in the present description and claims means that the fiber flock material may cover the whole surface of the shaped product and may adhere firmly to the whole surface of the shaped product. Preferred in accordance with the invention is an embodiment, wherein the fiber flock material is present only on a certain portion of the surface of the shaped product, particularly preferably on an exactly defined portion of the surface of the shaped product, but is adhered to said portion firmly. As will be described below in detail, the selection of the portion of the surface of the shaped product to which the fiber flock material is applied and firmly adhered may be determined solely or at least predominantly by decorative purposes. In an alternative embodiment, it is also possible that the selection of the portion of the surface of the shaped product to which the fiber flock material is applied and firmly adhered may be determined solely, or at least predominantly by utility purposes. It goes without saying that it is possible, too, to apply criteria which-are determined by both aspects (and, optionally, further other aspects) when determining that portion of the surface of the shaped product to which the fiber flock material is applied and firmly adhered.

In accordance with the invention in one of its preferred embodiments, a temperature hardened shaped ceramic article comprises at least one firmly adhering fiber flock material on at least a portion of its surface. The term "at least on a portion of its surface" as used in the present description and claims means that the fiber flock material may cover the whole surface of the temperature hardened (and—as described below in detail—optionally also glazed) shaped ceramic article and may adhere firmly to the whole surface of the shaped ceramic article. Preferred in accordance with the invention is an embodiment, wherein the fiber flock material is present only on a certain portion of the surface of the temperature hardened and optionally also glazed shaped ceramic article, particularly preferably on an exactly defined portion of the surface of the shaped ceramic article, but is adhered to said portion firmly. As will be described below in detail, the selection of the portion of the surface of the shaped ceramic article to which the fiber flock material is applied and firmly adhered may be determined solely or at least predominantly by decorative purposes. In an alternative embodiment, it is also possible that the selection of the portion of the surface of the shaped ceramic article to which the fiber flock material is applied and firmly adhered may be determined solely or at least predominantly by utility purposes. It goes without saying that it is possible, too, to apply criteria which are determined by both aspects (and, optionally, further other aspects) when determining that portion of the surface of the shaped ceramic article to which the fiber flock material is applied and firmly adhered.

A firm adhesion of the at least one fiber flock material to at least a portion of the surface of the shaped ceramic article may be achieved on each route known to a skilled person for the step of firmly adhering such materials to porous, dense or even smooth surfaces, without that the invention is restricted to certain routes. In a preferred embodiment of the invention, a firm adhesion of the fiber flock material to at least one portion, more preferably to one portion, of the surface of the shaped ceramic article is achieved by means of an adhesive layer which covers the (partial) surface of the shaped ceramic article which is to be coated with the fiber flock material. With respect to the adhesive of the adhesive layer, the skilled person is not barred by any limits, and all conceivable adhesives are suitable which effect a firm adhesion of the fiber flock material to the actual (partial) surface of the shaped ceramic article. In each single case, there are available to a skilled person numerous adhesives compatible with the material of the shaped ceramic article and with the intended fiber flock material as well, and optionally with further requirements (resistance against chemical substances, resistance against light, compatibility with food etc.).

In accordance with the invention in another one of its preferred embodiments, a shaped glass article comprises at least one firmly adhering fiber flock material on at least a portion of its surface. The term "at least on a portion of its surface" as used in the present description and claims means that the fiber flock material may cover the whole surface of the shaped glass article and may adhere firmly to the whole surface of the shaped glass article. Preferred in accordance with the invention is an embodiment, wherein the fiber flock material is present only on a certain portion of the surface of the shaped glass article, particularly preferably on an exactly defined portion of the surface of the shaped glass article, but is adhered to said portion firmly. As will be described below in detail, the selection of the portion of the surface of the shaped glass article to which the fiber flock material is applied and firmly adhered may be determined solely or at least predominantly by decorative purposes. In an alternative embodiment, it is also possible that the selection of the portion of the surface of the shaped glass article to which the fiber flock material is applied and firmly adhered may be determined solely or at least predominantly by utility purposes. It goes without saying that it is possible, too, to apply criteria which are determined by both aspects (and, optionally, further other aspects) when determining that portion of the surface of the shaped glass article to which the fiber flock material is applied and firmly adhered.

A firm adhesion of the at least one fiber flock material to at least a portion of the surface of the shaped glass article may be achieved on each route known to a skilled person for the step of firmly adhering such materials to porous, dense or even smooth surfaces, without that the invention is restricted to certain routes. In a preferred embodiment of the invention, a firm adhesion of the fiber flock material to at least one portion, more preferably to one portion, of the surface of the shaped glass article is achieved by means of an adhesive layer which covers the (partial) surface of the shaped glass article which is to be coated with the fiber flock material. With respect to the adhesive of the adhesive layer, the skilled person is not barred by any limits, and all conceivable adhesives are suitable which effect a firm adhesion of the fiber flock material to the actual (partial) surface of the shaped glass article. In each single case, there are available to a skilled person numerous adhesives compatible with the material of the shaped glass article and with the intended fiber flock material as well, and optionally with further requirements (resistance against chemical substances, resistance against light, compatibility with food etc.).

In preferred embodiments of the invention, the adhesive of the adhesive layer is a two-component adhesive having the advantage that the adhesiveness is still as good as it was, even after a certain storage time due to the separate storage of the different adhesive components. This results into a durable and firm adhesion of the fiber flock material to the material of the shaped product, for example to the ceramic material, glass material etc. Preferably, the adhesive is a two component adhesive on a solvent basis, and practically, a combination of an adhesive and a curing agent is used advantageously, which is commercially available, for example, from the company Kissel & Wolf GmbH (KiWo) as a combination of the adhesive MECOFLOC$^R$ L847-08 with the curing agent MECO-DUR$^R$ L5515. Other adhesives by which the same object is achieved are useable as well.

In a preferred embodiment of the invention, the adhesive layer present for a firm adhesion of the fiber flock material has a thickness of a fraction of the thickness of the material which changes at least one property of the surface of the shaped product, preferably a fraction of the length of the flocks, for example a thickness of about 10% of the length of the flocks; practically, this corresponds, for example, to a thickness of the adhesive layer of from 1 to 100 µm, preferably of from 10 to 100 µm, for example 40 to 60 µm. In single cases, adhesive layer thicknesses above or below the above range are possible. A person having ordinary skill in this technical field may decide upon the thickness without problems on the basis of the characteristic features of the layers of the material to be adhered to each other, preferably on the basis of the features of the fibers to be adhered, and the characteristic features of the material of the shaped article, preferably of the ceramic material, porcelain material, glass material etc. as well as on the basis of other parameters. The time periods between the application of the adhesive, particularly of the adhesive consisting of several components, and the start of the adhesive effects or application of the material changing at least one property of the surface of the shaped product or article, preferably of the fiber flock material, may depend upon the environmental conditions (e. g. temperature, pressure, humidity) and are in the range of from 20 seconds to 20 minutes, for example 10 to 15 minutes, for example at room temperature (20° C.) and normal pressure and 55% humidity of the air in accordance with the invention, without considering these values to be a restriction of the invention.

In a preferred embodiment of the invention, the shaped product comprises at least one bonding agent layer between its surface, on the one hand, and the adhesive layer, on the other hand. The advantage of such a bonding agent layer is that it provides an adhesiveness between the surface material of the shaped product and the adhesive layer which is substantially improved, compared to the situation without the presence of the bonding agent layer. Without wanting to be bound by this theory of the effect, it is assumed that this improvement is based on the fact that a kind of surface sealing of the material of the shaped product is achieved by the treatment of the material with the bonding agent, particularly at an elevated temperature. Such a sealing step creates a surface structure against the adhesive layer which is independent upon the material of the shaped product. The effect is an excellent adhesiveness between the material of the shaped product and the material changing at least one property of at least a portion of the surface of the shaped product. With the inclusion of this effect, an extraordinarily high composite adhesion is achieved on the surface of the material of the shaped product, and the resistance of the composite thus obtained against later environmental attacks is substantially enlarged. The bonding agent layer further reduces the interface diffusion and activates the surface of the shaped product for an optimum composite structure including the adhesive or adhesives of the adhesive layer. Particularly, a high value of the adhesion and resistance against corroding influences of chemically aggressive media is achieved. In accordance with the invention, several bonding agents may be selected; particularly preferable, however, is the use of one bonding agent.

In a particularly preferred embodiment of the invention, the shaped ceramic article comprises at least one bonding agent layer between the ceramic material or—in cases where at least one glaze layer is applied onto the ceramic material—between the glaze layer (in cases of more than one glaze layer: preferably between the glaze layer furthest distant from the ceramic material), on the one hand, and the adhesive layer, on the other hand. The advantage of such a bonding agent layer is that it provides an adhesiveness between the ceramic material or the outermost glaze layer, on the one hand, and the adhesive layer, on the other hand, which is substantially improved, compared to the situation without the presence of the bonding agent layer. Without wanting to be bound by this theory of the effect, it is assumed that this improvement is based on the fact that,a kind of surface sealing of the material of the shaped ceramic article is achieved by the treatment of the material (ceramic material or glaze layer) with the bonding agent, particularly at an elevated temperature. Such a sealing step creates a surface structure against the adhesive layer which is independent upon the material of the shaped product. The effect is an excellent adhesiveness between the material of the shaped article (ceramic material or glaze layer) and the adhesive material. With the inclusion of this effect, an extraordinarily high composite adhesion is achieved on the surface of the ceramic material or glaze layer material of the shaped article, and the resistance of the composite thus obtained against later environmental attacks is substantially enlarged. The bonding agent layer further reduces the interface diffusion and activates the ceramic or glaze surface of the shaped article for an optimum composite structure including the adhesive or adhesives of the adhesive layer. Particularly, a high value of the adhesion and resistance against corroding influences of chemically aggressive media is achieved. In accordance with the invention, several bonding agents may be selected; particularly preferable, however, is the use of one bonding agent.

In another preferred embodiment of the invention, the shaped glass article comprises at least one bonding agent layer between the glass material or—in cases where at least one glaze layer is applied onto the glass material—between the glaze layer (in cases of more than one glaze layer: preferably between the glaze layer furthest distant from the glass material), on the one hand, and the adhesive layer, on the other hand. The advantage of such a bonding agent layer is that it provides an adhesiveness between the glass material or the outermost glaze layer, on the one hand, and the adhesive layer, on the other hand, which is substantially improved, compared to the situation without the presence of the bonding agent layer. Without wanting to be bound by this theory of the effect, it is assumed that this improvement is based on the fact that a kind of surface sealing of the material of the shaped glass article is achieved by the treatment of the material (glass material or glaze layer) with the bonding agent, particularly at an elevated temperature. Such a sealing step creates a surface structure against the adhesive layer which is independent upon the material of the shaped product. The effect is an excellent adhesiveness between the material of the shaped article (glass material or glaze layer) and the adhesive material. With the inclusion of this effect, an extraordinarily high composite adhesion is achieved on the surface of the glass material or glaze layer material of the shaped article, and the resistance of the composite thus obtained against later environmental attacks is substantially enlarged. The bonding agent layer further reduces the interface diffusion and activates the glass or glaze surface of the shaped article for an optimum composite structure including the adhesive or adhesives of the adhesive layer. Particularly, a high value of the adhesion and resistance against corroding influences of chemically aggressive media is achieved. In accordance with the invention, several bonding agents may be selected; particularly preferable, however, is the use of one bonding agent.

For the selection of the bonding agent, a skilled person is not restricted in any way. Any desirable bonding agent of the state of the art may be used which is suitable for the purposes discussed above in detail. Such bonding agents may be selected by a person having ordinary skill in this technical field in accordance with the general knowledge and after considering the materials fo the shaped product involved. Without restricting the present invention, materials may be exemplified which are selected from the group consisting of silicon-containing bonding agents, zirconium-containing bonding agents (e. g. zirconates), titanium-containing bonding agents (e. g. titanates), phosphate bonding agents as well as bonding agents containing organic substances (e. g. chloroprene-, resorcinol-formaldehyde-, or isocyanate-containing bonding agents).

In accordance with the invention, even more preferred is the use of one bonding agent or several bonding agents which is/are selected from the group of silicon-containing bonding agents. In achieving great advantages, at least one Pyrosil$^R$ layer, most preferred exactly one Pyrosil$^R$ layer, is present as the bonding agent layer. When one Pyrosil$^R$ layer is present, even ceramic materials or glaze layers or glass materials for which it is difficult to adhere a fiber flock material, and in general all materials of a shaped product may be provided with a firmly adhering layer of a material which changes at least one surface property of at least a portion of the surface of the shaped product, particularly with a fiber flock material, in an optimum and durable manner. The bonding agent product commercially available under the designation Pyrosil$^R$ FB25 from the company Berger-Klebetechnik, Gossau, CH, is most preferred.

In particularly preferred embodiments of the invention, the PyroSil$^R$ layer preferably applied at an elevated temperature has a thickness of several atomic layers only, more preferably has a thickness of up to about 100 atomic layers, which is a thickness in the nanometer range, which, however, should not be understood to be a restriction. A person having ordinary skill in this technical field may determine an optimum thickness of the bonding agent layer by only few orienting preliminary experiments, which thickness may also be higher than the above-referenced range of values in single cases.

In accordance with the invention, it is even more preferred that the bonding agent layer also comprises a primer layer. The presence of the primer layer which, preferably, is present between the bonding agent layer and the adhesive layer, improves the adhesion of the adhesive layer to the substrate even more. One primer layer or several primer layers is/are conceivable, while the application of one primer layer is preferred. For the primer layer, there may be used every conceivable primer useable in accordance with a skilled person's knowledge for improving the adhesion of the materials presently involved, including a combination of several primers. Examples for the primers, without restriction of the present invention, are primers selected from the group of silicon-containing primers. Particularly preferably, the primer(s) is/are selected from the group consisting of silicon-containing primers, zirconium-containing primers (e. g. zirconates), titanium-containing primers (e. g. titanates), phosphate primers, where the most preferred primer used is the primer SurALink$^R$GP15 commercially available from the company SURA Instruments GmbH, Jena (DE) in the form of a primer layer which primer is adapted to the preferred bonding agent in the form of the Pyrosil$^R$ layer.

In particularly preferred embodiments of the invention, the Pyrosil$^R$ primer layer has a thickness of only few atomic layers, more preferably of up to 100 atomic layers and, hence, has a thickness in the nanometer range, without that this should be considered to be a restriction of the invention. A person having ordinary skill in this technical field may determine an optimum thickness of the primer layer by several few orienting preliminary experiments which thickness may also be at a value larger than the above range in single cases.

In the above described, particularly preferred embodiment, the pretreatment system consists of a combination of Pyrosil$^R$ and a silicon-containing primer adapted thereto. This is a particular example of a combined physical (Pyrosil$^R$) and chemical pretreatment (primer). Particularly preferably, the primer consists of a bonding agent which is present in a very diluted state. Typical concentrations of active components may be in a range of from 1 to 5%. Instead of a Pyrosil$^R$ treatment, an improved treatment may, under certain circumstances, also be achieved by flaming (without dotation), by a spray and blow corona treatment (without dotation), or by several kinds of plasma treatment. Particularly in cases of using a plasma treatment, an improvement of the adhesion may be obtained by an additive dosing of gases or aerosols. Another possible (classical) treatment for activating the surface is a (sand) blasting treatment. Particularly, in the course of a (sand) blasting treatment, a marked improvement of the adhesion may be achieved by additives which are added to the sand used for the blasting step. When conducting a chemical pretreatment, further components for improving the adhesion may be used in the primer systems together with the silicon-containing bonding agents already known. As organo-metallic or inorganic substances, there may be mentioned, for example, zirconates or titanates. There may also be used phosphates or organic substances as, for example, chloroprene, resorcinol-formaldehyde and isocyanates. There may also be used an etching step with several mineral acids (e. g. hydrofluoric acid) or a fluorination step in the gas phase, as variant embodiments of a chemical pretreatment without a preceding physical activation. By using such procedures, not only combinations of physical and chemical pretreatment steps are possible and are successful, but also may be used one or more than one of the above-mentioned physical pretreatment steps in an isolated manner or one or more of the above-mentioned chemical pretreatment steps in an isolated manner.

The fiber flock material firmly adhering to at least a portion of the shaped product, shaped ceramic article, shaped glass article, shaped polymer article, shaped wood article, shaped metal article and/or shaped composite article is defined, for the purposes of the present specification and claims as a bulk material consisting of a plurality of single fibers for example (but not restricted to that) having a length distribution as narrow as possible, which is supplied together with a gas, preferably with air, and which, when supplied, can be brought into the form of small flocks consisting of a large number of slightly connected single fibers. Depending upon the field of application, such flocks may be made to a more or less dense "carpet" of single fibers on a suitable substrate, which fibers are provided in layers arranged one upon the other and, by having such an arrangement, show the desired haptic, optical or other application properties as described hereinafter. Basically, any fibers may be used for a fiber flock material applied to a shaped product, temperature hardened shaped ceramic article, shaped glass article, shaped polymer article, shaped wood article, shaped metal article and/or shaped composite article etc. according to the invention, as long as they afford the desired properties. Instead of using fibers of equal length (fibers of a narrow length distribution), it is possible, too, in one embodiment of the invention to use fibers of different length; this is advantageous since a particularly pleasant haptic feeling is achieved and the fibers can be deposited on the substrate in a larger density.

In order to be able to determine the properties of such a fiber flock material in a manner as exactly as possible, synthetic fibers are used in a preferred embodiment of the invention, since for such synthetic fibers a detailed profile of requirements can be set out, and all fibers will show the same properties. The synthetic fibers may be of inorganic or of organic nature. In accordance with the invention, particularly preferred inorganic synthetic fibers are selected from the group consisting of mineral fibers, stone fibers, carbon fibers and metal fibers. Usually, particularly preferred organic synthetic fibers are fibers made of organic polymers as, for example, polyolefins, poly(carboxylic acids), polyesters, polyamides and polycarbonates. In accordance with the invention, polyesters and polyamides turned out to be a particularly good material for the fibers of the fiber flock material, particularly preferred poly(ethylene terephthalate) fibers and poly(hexamethylene adipamide) fibers (Polyamide-6,6 fibers). In achieving particular advantages, fibers of the above two groups are used as the fiber flock material which are commercially available under the designation "Polyester-(PET) cut flock" ("Polyester-(PET)-Schnittflock") and "Polyamide 6.6 (PA 6.6) cut flock" ("Polyamid 6.6.-(PA 6.6-)-Schnittflock") from the company SwissFlock Inc., Emmenbrücke (CH). These fibers may contain inorganic substances (for example pigments) for a coloration, potentially, for example carbon black (if a black coloration is desired). Other pigments or dyes usual for an application in the technical field of preparing colored fibers may, however, be used in an equal manner.

Preferably, the firmly adhering fiber flock material comprises polyamide fibers and/or polyester fibers having an average length of from 0.1 to 10 mm, preferably of from 0.1 to 5 mm, more preferably of from 0.3 to 3 mm.

The fiber flock material may be not colored, i. e. may consist of colorless fibers, or may be colored. Preferably, the fiber flock material is colored and, with respect to the coloration, it is adapted to the color of the substrate to which it is to be applied. There may be realized color harmonies or color contrasts or both.

In accordance with another preferred embodiment of the invention, the fiber flock material firmly adhering to the shaped product, shaped ceramic article, shaped glass article, shaped polymer article, shaped wood article, shaped metal article, shaped composite article etc. makes a dense surface covering the surface of the respective shaped article at least partly, or makes a dense "carpet of fibers". By at least covering the surface of the respective shaped article by a firmly adhering fiber flock material, the esthetic appearance of the shaped article, for example of the ceramic shaped article, is changed, compared to the ceramic shaped article not comprising the fiber flock material. Thus, by applying the fiber flock material, colored decorative surface effects may be achieved, for example effects distinguishing, with respect to their color, from the color of the ceramic shaped article, particularly effects contrasting from or harmonizing to the color of the surface of the ceramic shaped article, with respect to their color. Alternatively or simultaneously, an effect may be that a smooth, glazed surface of the respective shaped product or shaped article, for example the shaped ceramic article, may be in an esthetic contrast to the mate surface of the firmly adhering fiber flock material, and an esthetic effect is achieved as well. Another effect may be that the partial surface of the shaped product, for example of the shaped ceramic article or shaped glass article, covered with the firmly adhering fiber flock material extends beyond the remaining surface of the shaped product, for example of the shaped ceramic article or shaped glass article, more or less clearly. In all those cases, either the whole surface of the shaped product, for example the shaped ceramic article or the shaped glass article, in accordance with the invention may be covered with a single fiber flock material or may be covered with several fiber flock materials, or only a portion of the surface of the shaped product, for example of the shaped ceramic article or shaped glass article, may be covered with a single fiber flock material or with several fiber flock materials. Features distinguishing different fiber flock materials may be a different shape of the surface covering a portion of the surface of the shaped product, particularly of the shaped ceramic article or shaped glass article, may be a different color, may be a different height, compared to the remaining surface area of the shaped product, for example of the shaped ceramic article or shaped glass article, may be the different length of the fibers of the fiber flock material, may be the different density of the flock material or may be other distinguishing parameters.

It is another advantageous embodiment of the invention that the surface or partial surface of the shaped product, for example the surface of the shaped ceramic article, shaped glass article etc., covered, in accordance with the invention, with the fiber flock material provides an impression when touching or gripping it which is different from the impression provided by the surface of the shaped product, for example by the ceramic material of the shaped article or glass material of the shaped article and/or one or more glaze layer(s) applied to the surface of the shaped product, for example to the surface of the shaped ceramic article or of the shaped glass article etc. While the latter materials impart a cool and rough or cool and smooth feeling, respectively, the "carpet" made of fiber flock material(s) imparts a satin-like smooth or velvet-like smooth feeling which, in addition, is always convenient with respect to the temperature (and is in most of the cases at the temperature of the surrounding air).

Further advantages of the shaped products, for example of the shaped ceramic articles, glass articles etc. according to the invention, comprising, on at least a portion of their surface, at least one firmly adhering fiber flock material are that the (partial) surfaces of the shaped product, for example of the shaped ceramic article, shaped glass article, shaped polymer article etc., covered with the at least one firmly adhering fiber flock material remain at relatively cool temperatures even in such cases where the (partial) surface not covered with the fiber flock material is relatively hot. This may play a role in cases where the shaped product, for example the shaped ceramic article or shaped glass article or shaped metal article etc. is a vessel filled with a hot substance as, for example, with a hot liquid, or with a hot solid material which may heat up the walls of the vessel, or in cases where the shaped product, for example the shaped ceramic article, the shaped glass article, the shaped metal article etc. is heated by means of external energy sources (e. g. microwave energy of infrared energy). Due to the low value of the heat absorption of the high value of the thermal insulation property of the fiber flock material, the latter is not heated and may be touched or gripped without the use of any protection devices, even in such cases where the material of the shaped product, for example the ceramic material or glass material of the shaped article, cannot be touched due to its high temperature.

Furthermore, it was surprisingly found that shaped products according to the invention, for example shaped ceramic articles, shaped glass articles, shaped polymer articles, shaped wood articles, shaped metal articles or shaped composite articles, which contain, on at least a portion of their surface, at least one firmly adhering material which changes at least one property of at least a portion of the surface of the shaped product, preferably comprise a firmly adhering fiber flock material, are also suitable for food, i. e. may also be used in connection with steps of preparing, storing and taking up food, without that disadvantageous consequences for the food or for the consumer have to be expected.

Furthermore, it was a surprising result of the research work resulting into the present invention that that shaped products according to the invention, for example shaped ceramic articles, shaped glass articles, etc. according to the invention, which contain, on at least a portion of their surface, at least one firmly adhering material which changes at least one property of at least a portion of the surface of the shaped product, preferably comprise a firmly adhering fiber flock material, are also suitable for dish-washing in a commercially available dish-washer. In other words: Even after numerous sequences of dish-washing in a commercially available dish-washer for household or for professional dish-washing purposes and the use of a usual (in most cases: strongly alkaline) dish-washing agent, the material changing at least one property of at least a portion of the surface of the shaped product, preferably the firmly adhering fiber flock material, is not removed from the surface of the shaped product, for example from the surface of the ceramic surface or from the surface of the glazed ceramic surface of the shaped ceramic article or from the glass surface or from the glazed glass surface of the shaped glass article etc., neither completely nor partly. At least 1000 courses of dish-washing in a usual commercially available dish-washing machine and under the use of a commercially available, strongly alkaline dish-washing agent at temperatures up to 65° C. could be made without that the material, particularly the fiber flock material, was removed from the article surface. In detail, the present invention, in one of its preferred embodiments, relates to a shaped product having at least one material which changes at least one property of at least a portion of its surface applied to at least a portion of its surface, preferably a temperature-hardened shaped ceramic article or a shaped glass article having applied at least one fiber flock material to at least a portion of its surface, and having resistance against an alkaline-aqueous dish-washing solution of at least 1000 usual dish-washing and drying courses in usual dish-washers at temperatures of up to 65° C.

In accordance with the invention, particularly preferred are shaped ceramic articles having the above described advantageous features in the form of earthenware, stoneware, earthen stoneware and porcelain provided with at least one fiber flock material on at least a portion of its surface, whereby porcelain is particularly preferred in accordance with the invention.

In another preferred embodiment of the invention, particularly preferred are shaped glass articles having the above described advantageous features in the form of a glass material provided with at least one fiber flock material on at least a portion of its surface, for example drinking glasses having stems or surfaces which are, at least partially, covered with the fiber flock material described above, without that the invention is restricted thereto.

In cases where, in accordance with the invention, the whole surface of a shaped ceramic article is covered with at least one fiber flock material, preferably with one fiber flock material, the shaped ceramic article is provided with a glaze previously (even if it is possible basically to provide shaped ceramic articles with a fiber flock material according to the invention to which no glaze was applied). In cases where only a portion of the surface of the shaped ceramic article is covered with a fiber flock material, a glaze is provided preferably. In the intention to provide a preferred example, this may be done for shaped articles made of porcelain which serve for purposes of eating, drinking, preparing or serving food and/or drinks or for similar purposes in a household. For example, handles (e. g. of cups), surface areas (e. g. of beakers or plates), stems (e. g. of casserols or pots) of such articles may be covered with the fiber flock material. By doing so, not only optical effects (e. g. decorative effects) or haptic effects (e. g. effects relating to a pleasant touch are achieved, but it is also made possible that such articles, when filled with hot materials or heated by an external source of heat, may be touched or even gripped at those portions where the fiber flock material is found, since the fiber flock material will not become hot due to its poor heat absorption properties and its poor heat conducting properties but remains substantially at the temperature of the surrounding air, i. e. at such temperatures which are not experienced by a human to cause pain on the skin. In a similar way, exemplifying and also not restricting the invention, shaped articles made of glass may be provided, of which a part of the shaped glass article surface of the complete shaped glass article may be covered with a fiber flock material. Examples may be drinking glasses (e. g. wine glasses) the stem of which is covered with a fiber flock material, or glass vessels for storing food (e. g. preserves or honey) the lid or portions of surfaces of which is/are covered with a fiber flock material. The afore-mentioned examples serve to only explain the invention and do not serve to restrict the invention to certain embodiments.

According to the invention, the process for manufacturing the shaped product comprising on at least a portion of its surface a firmly adhering material changing at least one property of at least a portion of the surface of the shaped product may be conducted, for example, by the steps of manufacturing a crude shaped product having a defined structure, optionally providing the crude shaped product on at least a portion of its surface with a coating improving the utility thereof and providing at least a portion of the surface of the crude shaped product, optionally provided with said coating, with a firmly adhering material changing at least one property of at least a portion of the shaped product surface.

The step of manufacturing the crude shaped product may be conducted in accordance with process steps known to a person having ordinary skill in the present technical field, without that any restriction has to be applied. Depending upon the material, the manufacturing process may be a step of shaping by extrusion, casting, pressing, shaping in an injection mold, casting mold, powder mold (hot-isostatic pressing or cold-isostatic pressing), blowing (optionally also into a mold) etc. A skilled person may select a suitable shaping process in accordance with the material and with conditions suitable for the respective material in an optimum way on the basis of his ordinary skill. The shaping process may be conducted manually or automatically or semi-automatically and, optionally also under electronic control, depending upon the material and the complicated character of the desired shaped product.

In a subsequent process step, the crude shaped product manufactured in the first step may be provided with a coating. This process step is an optional and no compulsory step. In accordance with the invention, crude shaped articles are conceivable the further treatment of which may be conducted without a step of providing it with a coating. Such a coating may serve decorative purposes, only. However, it is preferred in accordance with the invention that the crude shaped article is provided with a coating which improves its utility. In this step, one coating or several coating may be applied to the shaped product. In case that several coatings are applied, these may serve different purposes or may serve the same purpose. Preferably, one coating is applied to the shaped product. In a preferred embodiment of the process of the invention, the coating serves the protection of the shaped product against physical or chemical damages, for example (not restrictive) the resistance against humidity, against etching (alkaline) or acidic chemical substances, against microbial attack and/or the improvement of a resistance of the shaped product against a push or shock. It goes without saying that the one or the several of the purposes mentioned above may be accompanied by esthetic aspects on which the application of a coating may be based.

In a further step of the process, a material is applied onto the shaped product which firmly adheres to the surface of the shaped product and changes at least one property of at least a portion of the surface of the shaped product. By such a process step, one property or several properties of the surface of the shaped product may be changed. Preferred is a change of one property or of two properties. Furthermore, it is conceivable to change this property/these properties on a portion of the surface or to change this property/these properties on the whole surface of the shaped product. In accordance with the invention, it is preferred to change at least one property of the surface on a portion of the surface of the shaped product.

With respect to the firm adhesion of the material applied, in the present process step, onto the surface of the shaped product, particularly by means of an adhesive bonding step, and with respect to the definition of the material changing at least one property of the surface of the shaped product, reference may be made to the above detailed description.

In a preferred embodiment of the invention, the inventive process of manufacturing a temperature-hardened shaped ceramic article comprising, on at least a portion of its surface, at least one firmly adhering fiber flock material is carried out by the steps of manufacturing a crude shaped ceramic article from a ceramic raw material, drying and/or sintering the crude shaped ceramic article and optionally providing said dried and/or sintered crude shaped ceramic article thus obtained on at least a portion of its surface with at least one glaze and baking said at least one glaze at an elevated temperature. Simultaneously or thereafter, at least one fiber flock material is adhered to at least a portion of the surface of the dried and/or sintered crude shaped ceramic article or to at least a portion of the surface of the temperature-hardened crude shaped ceramic article provided with said glaze.

In the frame of this process, the first manufacturing steps are carried out in accordance with processes per se known to a person having ordinary skill in this technical field, and no restriction is made for a skilled person when selecting these steps. Thus, in a conceivable embodiment of the invention, the step of manufacturing the crude shaped article may, for example, be carried out in such a way that a ceramic raw material is mixed and subjected to a modelling step (similarly as doing traditional pottery). In a similar way, it is possible that a ceramic raw material mixed by a mixing machine, for example a strand-like ceramic raw material, is pressed into a pre-made mold. Furthermore, a suspension of the mixed raw materials is cast into a mold by a step of slurry-casting, and excessive suspending agent is discharged. In a similar way, it is also possible to prepare a crude shaped article by process steps starting from a powder as the starting material, for example by dry-pressing or wet-pressing of a powdery ceramic raw material. However, the invention is not restricted to the above manufacturing routes mentioned only as examples, but all processes known to a person having ordinary skill in this field may be applied, too, in the frame of the present invention. Also in this respect, reference may be made to the above-referenced citations of "Römpp Chemielexikon" (Römpp Chemistry Dictionary), loc. cit.

A crude shaped article thus obtained on a per se known route is dried subsequently in a manner known per se. The at least one drying step required is conducted at elevated temperatures and at a controlled (in most cases at a low) humidity of the surrounding air. For the drying step, all per se known and conceivable processes may be carried out, as for example (without restricting the invention) the steps of so-called "kiln drying", air drying, rock drying, chamber drying or tunnel drying. Conceivable is also a step of drying by microwaves, where the crude shaped article is passed through an industrial microwave oven. The drying steps—as well known—are conducted at elevated temperatures (for example by making use of the discharged heat of parallel baking processes of other ceramic materials), for example at temperatures in the range of from 50 to 200° C., and at a controlled humidity of the air, for example at a controlled reduced air humidity.

Instead of conducting a drying step, of after the drying step, the crude shaped article (optionally after drying) may be subjected to a step of baking, also called "sintering". As is well known, the temperatures of the sintering step are >800° C. and—as also the temperature course of the sintering step—strongly depend upon the composition of the ceramic material, the desired porosity or density of the shaped ceramic article and the intended use of the final product.

An optional, i. e. non-compulsory step, however a frequently conducted and also per se known process step after sintering is to provide the shaped ceramic article already dried and sintered with a protective and/or decorative glaze and to bake or sinter the glaze on a per se known route. As is well known, also this process step is conducted at an elevated temperature, usually at >1000° C., and the temperature is again dependent upon the material used for the glaze, the desired density of the glaze and the intended use of the final product. As described, the application of a glaze is an optional step and, as such, is no compulsory, but a frequently applied precondition for the application of at least one fiber flock material onto at least a portion of the surface of the shaped ceramic article.

In another process which, according to the invention, is also preferred, a crude shaped article made of glass is prepared from a glass raw material which usually is molten by heating. This may be done by usual processes well known to a person having ordinary skill in this technical field of manufacturing glass, for example by casting into a mold, blowing in the (semi-) molten state or other glass shaping processes. The crude shaped article thus obtained is cooled down below the glass temperature in a known manner, is annealed usually in order to avoid tensions in the shaped glass article obtained, i. e. is cooled down to room temperature (for example 20° C.) under controlled temperature conditions and is provided optionally with a coating which may serve practical or decorative (or both) purposes. Thereafter, there follows the application of at least one material changing at least one property of the glass surface on at least a portion of the glass surface in the manner described above, which material, in particularly preferred embodiments of the invention, may be a fiber flock material of the present invention. Other examples of a material changing at least one property of the glass surface are a material changing the refractive index of the glass or a material changing the color of the glass or a material changing the transparency of the glass. Such material(s) may be applied to the whole shaped glass article or may be applied to a portion thereof, only, for example to the stem of a drinking glass.

The manufacture of crude shaped articles from other materials which are also suitable in accordance with the invention (polymers, wood, metals, composite materials) can be conducted on routes of shaping known to a person having ordinary skill in the respective technical field and, hence, need no further detailed description at this point.

It is preferred in accordance with the invention to apply to at least a portion of the surface of the dried and/or sintered crude shaped ceramic article or to at least a portion of the surface of the crude shaped ceramic article provided with a glaze and temperature-hardened as described above or to at least a portion of a crude shaped glass article at least one fiber flock material in an adhering manner. The route for adhering the at least one fiber flock material to at least a portion of the surface of the crude shaped article (optionally provided with a glaze) may be any desired way, provided that the application results into a firm adhesion of the fiber flock material. A person having ordinary skill in this technical field knows a number of routes to achieve this, and by carrying out only few orienting preliminary test experiments, the skilled person may find the optimum way which is adapted to the respective fiber flock material used and the ceramic material and—if present—the glaze, and in so far is optimized.

Basically, any desired type of fibers is suitable for a fiber flock material which is applied, according to the invention, to the temperature-hardened crude shaped ceramic article or the applied, baked glaze thereon or to the crude shaped glass article or the glaze applied thereon, provided that they afford the desired properties.

In order to be able to determine the properties of such a fiber flock material in a manner as exactly as possible, synthetic fibers are used in a preferred embodiment of the invention, since for such synthetic fibers a detailed profile of requirements can be set out, and all fibers will show the same properties. The synthetic fibers may be of inorganic or of organic nature. In accordance with the invention, particularly preferred inorganic synthetic fibers are selected from the group consisting of mineral fibers, stone fibers, carbon fibers and metal fibers. Usually, particularly preferred organic synthetic fibers are fibers made of organic polymers as, for example, polyolefins, poly(carboxylic acids), polyesters, polyamides and polycarbonates. In accordance with the invention, polyesters and polyamides turned out to be a particularly good material for the fibers of the fiber flock material, particularly preferred poly(ethylene terephthalate) fibers and poly(hexamethylene adipamide) fibers (Polyamide-6,6 fibers). In achieving particular advantages, fibers of the above two groups are used as the fiber flock material which are commercially available under the designation "Polyester-(PET) cut flock" ("Polyester-(PET)-Schnittflock") and "Polyamide 6.6 (PA 6.6) cut flock" ("Polyamid 6.6.-(PA 6.6-Schnittflock") from the company SwissFlock Inc., Emmenbrücke (CH).

Advantageously, polyamide fibers having an average length in the range of from 0.1 to 10 mm are used for the firmly adhering fiber flock material, preferably of from 0.1 to 5 mm, particularly preferably of from 0.3 to 3 mm. The optimum preparation of the adhesive surface has a strong influence on a firm adhesion of the fiber flock material to the (partial) surface of the shaped product provided for the adhesion, for example to the surface of the shaped ceramic article, shaped glass article etc., in order to allow that high adhesive forces may be built up. The surface has to be dry, free of dust, oil, release agents and other impurities. In a particularly preferred embodiment of the process of the invention, the surface of the shaped product, for example the ceramic surface of the crude shaped ceramic article or the surface of the shaped ceramic article provided with a glaze and baked thereafter, or the glass surface of the shaped glass article, is cleaned before the application of the fiber flock material. Such a cleaning step may be conducted on any route known to a skilled person in this technical field, as long as it affords the desired cleaning effect. In an even more preferred embodiment, the cleaning step is conducted in an aqueous phase, for example (preferred, but not restricted to this embodiment) in an aqueous-alkaline phase. For example, it turned out to be advantageous to subject the crude shaped article (optionally provided with a glaze) to a regular dish-washing course in a commercially available household or professional dish-washing machine while using an alkaline dish-washing agent, and to carefully dry the article in a dust-free environment. Such a treatment sequence resulted into a surface of the crude shaped article which was prepared in an optimum manner for the subsequent process steps.

In a further embodiment of the process of the present invention and preferred due to the results obtained, at least one bonding agent layer is applied to at least a portion of the surface of the shaped product, for example to the ceramic surface or to the glass surface of the crude shaped article, or to at least a portion of the glazed surface of the crude shaped article, before applying the fiber flock material. In a further preferred embodiment, such a step of applying a bonding agent layer is performed after the cleaning step as previously described and before the application of the fiber flock material. There may be applied one bonding agent layer, or there may be applied several bonding agent layers. In the latter case, the several bonding agent layers may comprise the same bonding agent or may comprise different bonding agents. The application of one bonding agent layer is preferred. In particularly preferred embodiments, the at least one bonding agent layer is selected from silicon-containing bonding agents. In a very advantageous manner, at least one, most preferably exactly one Pyrosil$^R$ layer is used as the bonding agent layer. Most preferred is the bonding agent product commercially available under the designation Pyrosil$^R$ FB25 from the company Berger-Klebetechnik, Gossau (CH).

The Pyrosil$^R$ process proposed by the company Berger-Klebetechnik, Gossau (CH) which is known in the technical field of preparing surfaces and which is used particularly preferably in accordance with the invention in order to apply the bonding agent to the (partial) surface of the shaped product, for example to the (partial) surface of the shaped ceramic article or shaped glass article, to be provided with the fiber flock material, consists in the steps of activating the Pyrosil$^R$ material, for example by means of a hot gas stream, and to apply the material in the form of a very thin layer, not perceivable for the eye, onto the surface of the shaped product, for example the surface of the shaped ceramic article or shaped glass article, which, lateron, has to be provided with the fiber flock material. By means of the Pyrosil$^R$ material, an excellent adhesive force between the substrate and an adhesive to be applied is achieved, and the resistance of the composite layer against influences by the environment is increased substantially. Particularly preferred is the application of the at least one bonding agent layer by flaming, i. e. by thermally activating the surface of the substrate and the bonding agent.

In accordance with the invention, it is preferred to apply also at least one primer layer on at least a portion of the bonding agent layer(s) in addition to the bonding agent layer, i. e. after its application. There may be applied one primer layer, or there may be applied several primer layers. In the latter case, the primers of different primer layers may be identical or may be different from each other. Preferably, one primer layer is applied. The primer serves a further improvement of the adhesion of the fiber flock material and an improved protection of the composite against corroding influence, for example of alkaline cleaning solutions. In particularly preferred embodiments of the invention, the primer is, or the primers are, selected from the group of silicon-containing primers, whereby, in a most preferred embodiment, the primer SurALink$^R$ GP15 available from the company SURA Instruments GmbH, Jena (DE), is used in the form of a primer layer which is adapted to the bonding agent layer of Pyrosil$^R$.

Another embodiment of the invention which is also preferred, is that at least one adhesive layer is applied to that portion or those portions of the surface of the shaped ceramic article, to which the fiber flock material is to be adhered, before the application of the fiber flock material. The application of the at least on adhesive layer is preferably carried out after the application of the at least one bonding agent layer and before the application of the fiber flock material and, even more preferred, after the application of the at least one primer layer and before the application of the fiber flock material.

In preferred embodiments of the process, a two-component adhesive is used as the adhesive of the adhesive layer. This results into a durable and firm adhesion of the fiber-flock material to the ceramic material. As the adhesive, a two-component adhesive on a solvent basis is preferably used, and most advantageously, an adhesive-curing agent combination is practically used, which is commercially available as a combination of the adhesive MECOFLOCK$^R$ L847-08 with the curing agent MECODUR$^R$ L5515 from the company Kissel & Wolf GmbH (KiWo).

In a particularly preferred embodiment of the process of the invention, the fiber flock material is applied to the surface of the shaped product, in particular to the surface of the shaped ceramic article or shaped glass article, provided with the adhesive (and optionally with the bonding agent and the primer) immediately after the application of the adhesive. The rapid sequence of the process steps "application of the adhesive" and "application of the fiber flock material" serves an optimization of the procedure, not only in the sense of a reduction of the overall process time, but also an improvement of the adhering step result. In this connection, reference is made to the above explanations relating to the fact that not only chemical but also physical processes and also combinations of physical and chemical processes may be used for a pretreatment of the surfaces. Those processes, for example, comprise that a primer used in the process comprises an adhesive component as an integral component.

Another embodiment of the process which is also preferred in accordance with the invention relates to the application of the flock material to shaped products while applying en electrical field. This embodiment is particularly preferred, if the shaped article to which the flock material is to be applied has a complicated three-dimensional structure. When using this variant of the process, an electrical field is applied to the shaped product to be coated, for example to the shaped ceramic article or to the shaped glass article, and the material to be coated, e. g. the fiber flock material, is charged with an opposite charge. By using advantageously the mutual attraction of the opposite charges, even geometrically complicated structures may be provided with a layer of the material, for example with a layer of the fiber flock material, without any problems. This can be performed practically in such a way that, for example, highly conductive materials are included into the shaped products, for example into the shaped ceramic articles or shaped glass articles, which, due to the nature of the materials they consist of, are poor metallic conductors. In another variant of the process of the invention, the adhesive and/or the primer may be provided with a defined conductivity by adding metal particles. Shaped products to be treated are then put onto an iron core. In this case, a sufficient grounding has to be provided.

It is even more preferred in accordance with the invention due to the excellent results achieved by such a variant of the process to adjust a certain humidity of the air in the course of the step of application of the flock material. The suitable values of the air humidity may easily be determined by a skilled person by few experiments, but is, in an ideal manner (and, hence, even more preferably) at 60% at room temperature (20° C.). When adjusting such conditions, the application of the flock material to the shaped product, for example to the shaped ceramic article, shaped porcelain article, shaped glass article etc., may be achieved in an efficient way, and the fiber flock material firmly adheres to the respective material surface.

In accordance with the invention, it is particularly advantageous and, hence, particularly preferred that at least one template is applied to the cleaned surface of the shaped product, for example to the ceramic surface of the shaped ceramic article or to the glass surface of the shaped glass article, which template limits the portions of the ceramic surface of the shaped ceramic article optionally to be provided with the at least one bonding agent layer and/or with the at least one primer layer and with the at least one adhesive layer to those portions to which the fiber flock material is to be adhered firmly. There may be used one template, or there may be used several templates. The use of one template is preferred. Such a template preferably shields those parts or portions of the surface which surround that portion/those portions to which the fiber flock material is to be adhered firmly, and leaves that portion/those portions unshielded to which the fiber flock material is to be adhered firmly. For example, such a template (or collar) may completely shield a shaped ceramic article as, for example, a cup made of porcelain and leave unshielded only the handle of the cup, if only the handle is to be provided with the fiber flock material. In accordance with another example, such a template, for example, for a porcelain beaker may shield the whole outer surface of the beaker except two square areas opposite to each other, on the outer wall, in the circumference direction, if two opposite square areas made of the fiber flock material are to be adhered to the outer wall of the beaker. The areas shielded by such templates (which were described only as examples without restricting the invention to those examples) are coated neither with a bonding agent nor with a primer nor with an adhesive, while the areas left unshielded by the template or by several templates are coated with the at least one bonding agent and with the at least one primer and with the at least one adhesive as well. The application of the at least one bonding agent and/or the at least one primer and/or the at least one adhesive to the unshielded areas of the surface of the shaped ceramic article is conducted, in an advantageous embodiment of the process, by spaying; the spraying step is a very economic way of application of the materials particularly in cases of a mass production.

Following the application of the adhesive, the template/templates is/are removed preferably. Thereafter, the at least one fiber flock material may be applied. In a particularly economic way, this may be performed by spaying, too. Due to the clean limitation of the bonding agent layer(s), primer layer(s) and/or adhesive layer(s), the fibers of the fiber flock material applied by spraying adhere substantially exclusively on the adhesive layer only, i. e. at those portions of the surface where an application of the fiber flock material is intended. Hence, in the course of such a procedure of applying the fiber flock material, a clearly-delimited layer made of the decorative, haptically pleasant and technical effective (heat insulation) fiber flock material is achieved at one or more than one area(s) of the surface of the shaped ceramic article (or on its whole surface).

In a similar way as when using the template(s), surface areas of the shaped product, for example of the shaped ceramic article or of the shaped glass article, which are not to be coated with a bonding agent and/or with a primer and/or with an adhesive and with the fiber flock material, may be provided with a coating of a suitable solid or liquid, but solidifying material in order to shield the respective areas of the surface against the application of the material(s). Non-restricting examples of such a material are waxes, silicones, rubbers, self-adhesive films, to name only few examples. Such coatings protect the areas not to be provided with the flock material and save the corresponding steps of cleaning the shaped product when finally treating the product.

In a final treatment step, preferably at least that portion of the surface of the shaped product, for example of the shaped ceramic article or of the shaped glass article, covered by at least the fiber flock material is cured. Such a curing step may be conducted advantageously by treating the article at room temperature or at a slightly elevated temperature, for example by drying the adhesive layer by allowing to stand at room temperature or at slightly elevated temperature. Alternatively, the shaped product, for example the shaped ceramic article or shaped glass article, having applied the fiber flock material may be exposed to a gas stream at room temperature or at slightly elevated temperature, for example to an air stream. Preferably, the whole shaped product, for example the shaped ceramic article or shaped glass article, covered on at least a portion of its surface with a fiber flock material is cured, and in an even more preferred manner, the curing is conducted at a temperature slightly elevated, compared to room temperature, most preferably at room temperature. The curing time at room temperature (20° C.) is approximately 72 h. However, it is possible (and, in accordance with the invention, results into an; extraordinarily good adhesion of the fiber flock material to the shaped product, for example to the shaped ceramic article or shaped glass article) to conduct the curing step at an elevated temperature (of, for example, up to 80° C. in a drying chamber). The curing time may be reduced thereby down to 0.5 h.

The invention also relates to the use of the shaped products described in detail above, for example of the shaped ceramic articles, shaped glass articles, shaped polymer articles, shaped wood articles, shaped metal articles and shaped composite material articles, for household purposes, laboratory purposes, or industrial purposes or in the building construction field. The use may, for example, cover uses of shaped ceramic articles—preferably as porcelain articles—as table ware, drinking vessels of cooking vessels. As described above in the form of examples, for example cups or beakers made of porcelain may be provided on their surface, or on a portion or on several portions thereof, with one or more fiber flock material(s). Considering, on the one hand, the optical and haptic purposes, the cups or beakers, on the other hand, may be provided with areas where they may be gripped or held, if their content is so hot that the remaining portion of the vessel is heated to such a temperature no longer allowing a gripping or holding of the cup or beaker. A similar view is also applicable to table ware parts, e. g. made or porcelain, or cooking vessels, e. g. made of porcelain. Even after having been exposed to external heat sources (as, for example to a microwave oven or to an infrared oven for heating purposes), the may be touched and gripped at those areas of their surface which are provided with the fiber flock material in accordance with the invention.

Further fields of use are the use of shaped ceramic articles for roofing purposes (tiles) or as covering for floors and walls (tiles). The use of shaped products having (partial) surfaces changing "normal" surfaces of shaped products at least with respect to one property on at least a portion of the surface may also be applied in the field of sanitary ceramics, for example for washbasins, toilet bowls, bidet bowls, bathtubs or shower tubs. Shaped articles made of glass having a coating of the above-referenced materials changing at least one property of their surface, preferably having a coating of a fiber flock material, may be used as household glasses (for example drinking glasses), tea glasses (thermal insulation), glasses for storing of articles of all kind, for example of food, as glass bottles for fragrances and perfumes, as insulating vessels for hot and cold liquids, as mirrors and as flat glass, for example for windows.

The above-referenced examples, however, should not be understood to restrict the invention, but only as examples to explain the invention.

The invention claimed is:

1. A shaped product, comprising:
   a shaped product surface having a surface area;
   a physical pre-treatment layer for imparting improved adhesion positioned on at least a portion of the surface area of the shaped product;
   a chemical pre-treatment layer positioned on the physical pre-treatment layer such that the physical pre-treatment layer is positioned between the chemical pre-treatment layer and the surface area of the shaped product;
   an adhesive layer disposed on the chemical pre-treatment layer such that the chemical pre-treatment layer is positioned between the physical pre-treatment layer and the adhesive layer; and at least one fiber flock material adhered to the adhesive layer and the at least one fiber flock material for changing a property of the surface area of the shaped product.

2. The shaped product according to claim 1, further wherein the chemical pre-treatment layer comprises at least one silicon-containing primer.

3. The shaped product according to claim 1, wherein the physical pre-treatment layer is applied to and bonded to the at least a portion of the surface of the shaped product.

4. The shaped product according to claim 1, wherein the fiber flock material is for changing at least one optical property, haptic property, thermal property, chemical property, biological property or a combination of at least two of the above properties of the shaped product.

5. The shaped product according to claim 1, wherein the fiber flock material is in the form of a layer.

6. The shaped product according to claim 5, wherein the fiber flock material includes at least one of the following: inorganic synthetic fibers and organic synthetic fibers.

7. The shaped product according to claim 5, wherein the fiber flock material includes at least one of the following: mineral fibers, stone fibers, carbon fibers, metal fibers as inorganic synthetic fibers and polyester fibers, polyamide fibers as organic synthetic fibers.

8. The shaped product according to claim 5, wherein the fiber flock material consists of polyethylene terephthalate fibers and/or poly-(hexamethylene adipinamide) fibers (polyamide-6,6 fibers).

9. The shaped product according to claim 1, wherein the shaped product further includes a glaze layer positioned between the shaped product surface and the physical pre-treatment layer.

10. The shaped product according to claim 9, wherein the shaped product is made of a ceramic material that includes at least one of the following: coarse ceramic, fine ceramic, earthenware, stoneware, pottery and porcelain.

11. The shaped product according to claim 9 wherein the shaped product optionally having a glaze layer and having the physical pre-treatment, chemical pre-treatment, adhesive and fiber flock layers on its surface has a resistance to alkaline-aqueous dish-washing solution of at least 1000 washing and drying cycles in dishwasher at temperatures up to 65° C.

12. The shaped product according to claim 1, wherein the shaped product is capable of being used in the household, laboratory, or industrial fields or in the building construction field.

13. The shaped product according to claim 1, wherein the shaped product has the shape of tableware, a drinking vessel, a drinking glass or a cooking vessel.

14. A shaped ceramic article, comprising:
a shaped ceramic article surface;
at least one physical pre-treatment layer for imparting improved adhesion positioned on at least a portion of the shaped ceramic article surface;
a chemical pre-treatment layer disposed on the physical pre-treatment layer;
an adhesive layer disposed on the chemical pre-treatment layer such that the chemical pre-treatment layer is positioned between the physical pre-treatment layer and the adhesive layer; and
a firmly adhering fiber flock material joined to at least a portion of the adhesive layer and the firmly adhering fiber flock material for changing a property of the surface area of the shaped product.

15. The shaped ceramic article according to claim 14, wherein the physical pre-treatment layer is applied to at least a portion of the shaped ceramic article surface so as to create an activated surface such that it bonds strongly with the layers disposed more remote from the shape ceramic article surface.

16. The shaped ceramic article according to claim 15, wherein the chemical pre-treatment layer includes a primer.

17. The shaped ceramic article according to claim 14, wherein the shaped ceramic article surface includes a course ceramic material.

18. The shaped ceramic article according to claim 14, wherein the shaped ceramic article includes a ceramic material and wherein the ceramic material is porcelain.

19. The shaped ceramic article according to claim 14, further including at least one glaze layer applied to the shaped ceramic article surface and the glaze layer is positioned between the physical pretreatment layer and the shaped ceramic article surface.

20. The shaped ceramic article according to claim 19 wherein the at least one glaze layer includes at least one of the following: kaolin, calcspar (calcite), dolomite, feldspar, kaolin fireclay quartzs and containing admixed, for example, $SnO_2$, $ZrO_2$ and optionally admixed metal oxides.

21. The shaped ceramic article according to claim 14, further including a glaze layer disposed on the portion of the shaped ceramic article surface.

22. The shaped ceramic article according to claim 21, wherein the physical pre-treatment layer includes a silicone-containing bonding agent, and the chemical pretreatment layer includes at least one primer for improving the adhesion of the adhesive layer.

23. The shaped ceramic article according to claim 14, wherein the firmly adhering fiber flock material comprises synthetic fibers.

24. The shaped ceramic article according to claim 14, wherein the firmly adhering fiber flock material comprises polyester fibers and/or polyamide fibers having an average length of from 0.1 to 10 mm.

25. The shaped ceramic article according to claim 14, wherein the firmly adhering fiber flock material is arranged in a form to influence the esthetics of the shaped ceramic article.

26. The shaped ceramic article according to claim 14 wherein the shaped ceramic article optionally having a glaze layer and having the physical pre-treatment, chemical pre-treatment, adhesive and flock layers on its surface has a resistance to alkaline-aqueous dish-washing solutions and is capable of withstanding at least 1000 washing and drying courses in an automatic dishwasher at temperatures up to 65° C.

27. The shaped ceramic article according to claim 14, wherein the shaped ceramic article is selected from the group consisting of earthenware, stoneware, pottery or porcelain.

28. A shaped glass article comprising,
a shaped glass article surface having a surface area,
a physical pre-treatment layer for imparting improved adhesion positioned on at least a portion of the shaped glass article surface,
a chemical pre-treatment layer positioned on the physical pre-treatment layer;
an adhesive layer disposed on the chemical pre-treatment layer and the chemical pre-treatment layer is positioned between the physical pre-treatment layer and the adhesive layer; and
at least one fiber flock material adhered to the adhesive layer and the at least one fiber flock material for changing a property of the surface area of the shaped glass product.

29. The shaped glass article according to claim 28, wherein the adhesive layer includes a two component adhesive.

30. The shaped glass article according to claim 28, wherein the chemical pre-treatment layer includes a primer.

31. The shaped glass article according to claim 28, wherein the shaped glass article having the physical pre-treatment, chemical pre-treatment, adhesive and flock layers on its surface has a resistance to alkaline-aqueous dish-washing solution of at least 1000 washing and drying cycles in dishwasher at temperatures up to about 65° C.

32. A method of making a shaped product, shaped ceramic article or shaped glass article with a touch friendly surface comprising:

provides a shaped product, shaped ceramic article or shaped glass article having a surface with a surface area;

generating at least one layer by a physical pre-treatment and disposing the at least one layer on the surface area of the surface;

applying a chemical pre-treatment layer on the physical pre-treatment layer;

providing an adhesive layer and positioning the adhesive layer on the chemical pre-treatment layer;

providing at least one fiber flock material and disposing the at least one fiber flock material on the adhesive layer; and utilizing the adhesive layer, the chemical pre-treatment layer and the physical pre-treatment layer for effecting an improved adherence of the at least one fiber flock material, to form a touch friendly surface on the surface in order that the shaped product, shaped ceramic article or shaped glass article is capable of being used in the household, laboratory, industrial fields or building construction field.

33. The method according to claim 32 further including proving the shaped product, shaped ceramic article or shaped glass article to be in the form of table ware, drinking vessel, drinking glass or cooking vessel.

34. The method according to claim 32, wherein the fiber flock material is selected from the group consisting of: synthetic fibers, inorganic synthetic fibers, organic synthetic fibers, mineral fibers, stone fibers, carbon fibers, metal fibers as inorganic synthetic fibers, polyester fibers and/or polyamide fibers as organic synthetic fibers, or polyethylene terephthalate fibers or poly-(hexamethylene adipinamide)fibers (polyamide-6,6 fibers).

35. The method according to claim 32, wherein the fiber flock material comprises polyester fibers and/or polyamide fibers having of a length of 0.1 mm to 10 mm.

36. The method according to claim 32, wherein the at least one physical pre-treatment layer for improving adhesion includes a silicone-containing material.

* * * * *